United States Patent [19]
McNamara

[11] Patent Number: 5,947,859
[45] Date of Patent: Sep. 7, 1999

[54] LOCKING DIFFERENTIAL

[75] Inventor: Jeffrey Neville McNamara, Brighton, Australia

[73] Assignee: Jack McNamara Differential Specialist Pty Ltd., Moorabbin, Australia

[21] Appl. No.: 08/874,475

[22] Filed: Jun. 16, 1997

[30] Foreign Application Priority Data

Jun. 17, 1996 [AU] Australia ............................. P-400475

[51] Int. Cl.⁶ ................................................ F16H 48/06
[52] U.S. Cl. ......................................... 475/237; 425/231
[58] Field of Search ..................................... 475/231–237

[56] References Cited

U.S. PATENT DOCUMENTS

| | | | |
|---|---|---|---|
| 1,719,095 | 7/1929 | West ......................................... | 475/237 |
| 2,132,692 | 10/1938 | Lawrence ................................. | 475/237 |
| 3,105,394 | 10/1963 | Salzmann ................................. | 475/237 |
| 3,908,775 | 9/1975 | Van Fossen ............................. | 475/231 |
| 4,304,317 | 12/1981 | Vanzant et al. ..................... | 475/231 X |
| 4,555,962 | 12/1985 | Bucarelli ................................. | 475/237 |
| 4,950,214 | 8/1990 | Botterill .................................. | 475/231 |
| 5,007,886 | 4/1991 | Holmquist et al. ..................... | 475/231 |
| 5,171,192 | 12/1992 | Schlosser et al. ....................... | 475/237 |
| 5,342,255 | 8/1994 | Slensinski et al. ..................... | 475/231 |
| 5,591,098 | 1/1997 | Jones et al. ............................. | 475/231 |
| 5,673,777 | 10/1997 | Ziech .................................. | 475/237 X |

FOREIGN PATENT DOCUMENTS

| | | |
|---|---|---|
| 534218 | 5/1979 | Australia . |
| 565257 | 6/1985 | Australia . |

Primary Examiner—Khoi Q. Ta
Attorney, Agent, or Firm—J. Stewart Brams

[57] ABSTRACT

A lockable differential having a carrier and opposed bevel gears which engage respective shafts, and opposed pinion gears which engage the bevel gears, wherein a locking means includes a selector annulus engaging the carrier, a locking annulus engaging the carrier and selectively engagable with one of the bevel gears, and push rods connecting the selector annulus with the locking annulus for moving the locking annulus between locked and unlocked positions in which the locking annulus is, respectively, engaged with and disengaged from the selectively engagable one of the bevel gears.

9 Claims, 2 Drawing Sheets

LOCKING DIFFERENTIAL

FIELD OF THE INVENTION

The invention relates to a locking differential for a vehicle or a machine.

BACKGROUND OF THE INVENTION

Whilst the following discussion concerns locking differentials for vehicles it is to be understood that the same principles apply to machines which have the need of a differential.

Basically a differential is incorporated in an automobile in association with the back wheel axles. This provides a means by which each wheel can be rotated at different relative speeds. The need for a difference in the respective speeds of wheels will be readily apparent when considering this in the context of cornering of a vehicle.

In this respect the conventional differential includes a pinion gear, a ring gear, differential side gears and differential pinion gears. The working relationship of these elements is well known.

It is common for such type of differentials to permit one wheel to rotate independently of an opposite wheel, for example, a pair of back wheels in a rear wheel drive vehicle. In particular, if the wheels of the vehicle encounter slippery surfaces such as mud or ice, skidding may occur. In this instance the wheel encountering the slippery surface will spin and the rotation of the opposite wheel is correspondingly impeded. This can result in the spinning wheel becoming bogged with little opportunity of the rotation of the opposite wheel on firm ground driving the vehicle away from the slippery surface. In such situations it is desirable to restrain the rotation of one wheel so it may be generally synchronous with the rotation of the opposite wheel. This is known as the lockable differential which ensures that the two wheels rotate at essentially the same rate. In this way the wheel which has a firm contact with the ground compensates for the other wheel that is on a slippery surface.

In order to gain the advantages of the conventional differential and the lockable differential, a compromise was designed and known as the limited slip differential. This type of differential allows some speed variations between the wheels but gives sufficient synchronisation between the pair of opposing wheels to be effective on slippery surfaces.

The present invention relates to the lockable type of differential. One example of a lockable differential is disclosed in Australian patent no. 534218. This differential relies upon the use of coaxial axles, one of which can be moved into the internal cavity of the differential and engage the carrier. This locks the differential. Dog clutches have also been used previously in a similar fashion so that the coaxial axles actually inter-engage and lock the differential.

Another example of a known lockable differential is disclosed in Australian patent no. 565257 which proposes the use of an annular piston. By moving the piston, a sleeve is moved which causes an annulus to engage a bevel gear and lock the differential. In use, this type of differential locking system is actuated by applying compressed air to one side of the piston. However, this annular piston is a complex design which is expensive to manufacture and time consuming to install.

OBJECT OF THE INVENTION

It is an objective of the present invention to provide a lockable differential which can be releasably locked without the need for a special cage piston or devices which occupy the central cavity of the conventional differential.

SUMMARY OF THE INVENTION

According to one form of the invention a lockable differential is provided including:
  (a) a carrier;
  (b) a first bevel gear to engage a first shaft;
  (c) second bevel gear disposed opposite the first bevel gear to engage a second shaft;
  (d) a first pinion gear and second pinion gear, disposed opposite to each other, and supported by the carrier and each engaging the first and second bevel gear;
  (e) locking means to lock the differential including
     (i) a selector annulus engaging the carrier;
     (ii) a locking annulus engaging the carrier and selectively engaging the first bevel gear; and
     (iii) a plurality of push rods connecting the selector annulus and the locking annulus,
wherein the locking means is movable between an unlocked position in which the locking annulus is not engaged with the first bevel gear to a locked position in which the locking annulus is engaged with the first bevel gear.

According to another preferred form of the invention, the locking means includes an actuator to move the selector annulus between the unlocked position and the locked position. Typically the actuator is pneumatically, hydraulically or mechanically operated so it can actuated from a remote location. When the actuator is mechanical it is typically a rod which extends from the selector annulus to a remote location.

According to a preferred form of the invention, the selector annulus has internal splines which engage with external splines on the carrier to permit the selector annulus to move between the unlocked position and the locked position.

According to another preferred form of the invention, the locking annulus has internal splines which selectively engage with external splines on the first bevel gear, and external splines which engage with internal splines on the carrier. In this embodiment when the selector annulus is in the unlocked position the internal splines on the locking annulus do not engage the external splines on the first bevel gear. Conversely, when the selector annulus is in the locked position the internal splines on the locking annulus engage the external splines on the first bevel gear to lock the differential.

Preferably the selector annulus and the locking annulus are coaxially aligned.

According to another preferred form of the invention, the push rods are disposed at regular arcuate intervals about the selector annulus and the locking annulus. Typically the push rods are parallel to the axis of selector annulus and/or the locking annulus. Preferably there are four push rods. The push rods may be connected to the selector annulus and the locking annulus by bolts which engage internal threads in the ends of the push rods.

DESCRIPTION OF THE DRAWINGS

The invention will now be further explained and illustrated by reference to the accompanying drawings in which.

Figure 1:
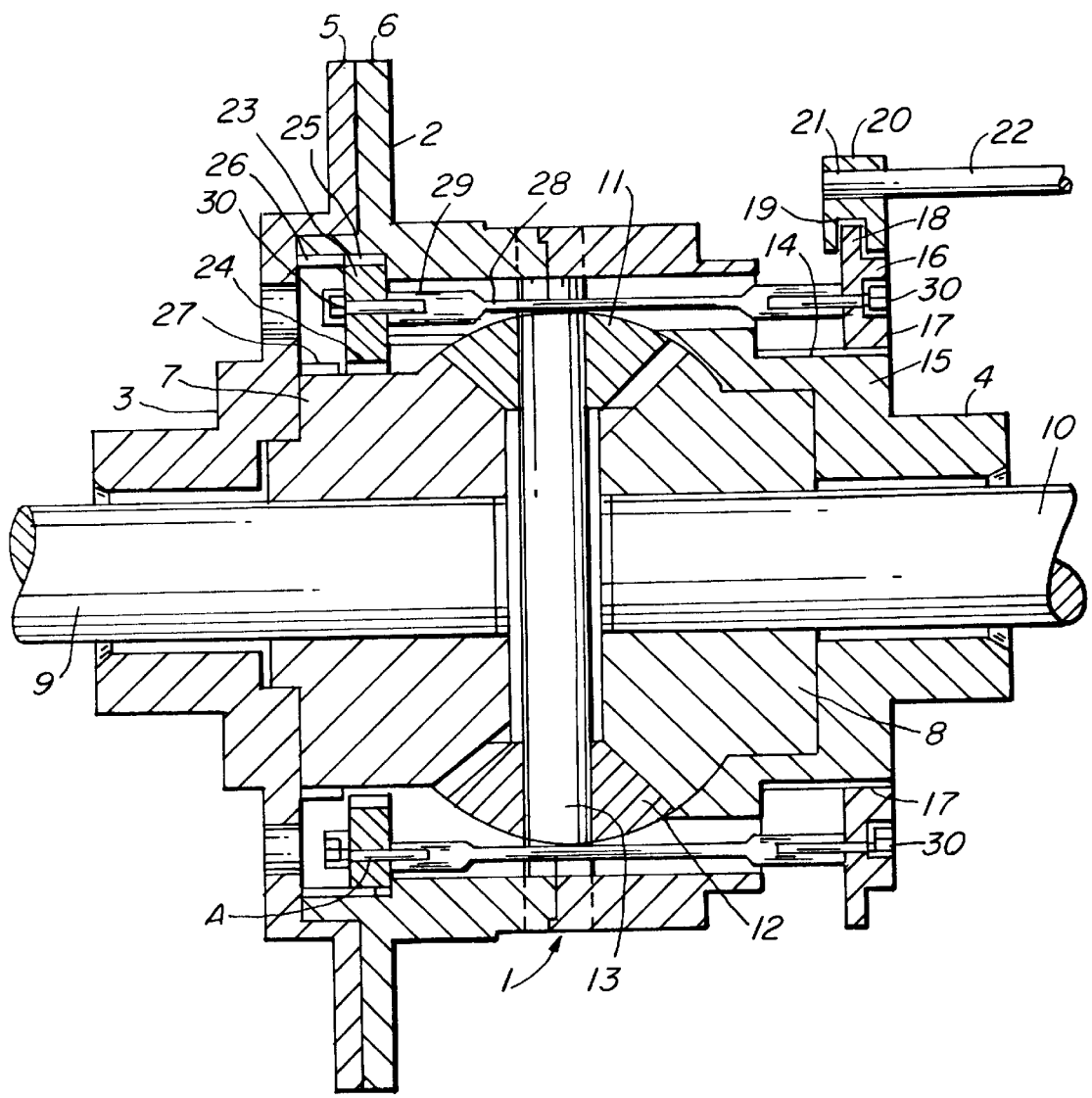
FIG. 1 is a cross-sectional view of a differential according to one form of the invention in the unlocked position.

In the cavity, a pair of bevel gears 7 and 8 are respectively mounted to rotate shaft 9 and shaft 10. Typically, these shafts are axle shafts which in turn cause a pair of wheels to rotate. A pair of pinion gears 11 and 12 are also located in the cavity and are fixed in position relative to the carrier 2 by a pin 13 but free to rotate about pin 13. The bevel gears 7 and 8 engage the pinion gears 11 and 12.

A set of annular external splines 14 is formed on hub 15 of cover 4. Selector annulus 16 has a set of internal splines 17 which slidingly engage with splines 14. Selector annulus 16 also has an outward extending flange 18 which engages in a slot 19 in arm 20 of actuator 21. Actuator 21 is operated by rod 22. As such, when rod 22 causes the actuator 21 to move, the selector annulus 16 moves along hub 15.

A locking annulus 23 is located inside the cavity of carrier 2 and has a set of internal splines 24 and a set of external splines 25. Cover 4 is provided with a set of internal splines 26 which has an axial length which is at least twice that of external splines 25 of the locking annulus 23. Bevel gear 7 is provided with a set of external splines 27 which have an axial length which is approximately the same as that of the internal splines 24 of the locking annulus 23.

Push rods 28 have threaded openings 29 at each end and extend between the select annulus 16 and locking annulus 23. Bolts 30 extend through respective openings in the selector annulus 16 and locking annulus 23, and engage in threaded openings 29. When the bolts 30 are tightened the selector annulus 16 and locking annulus 23 are firmly connected so they move together.

In use the differential operates as follows.

As shown in FIG. 1, the differential 1 is in the unlocked position. In this position the actuator 21 holds the selector annulus 16 at position A. In this position the locking annulus 23 is located at the extremity of splines 26 of cover 4, and does not engage the splines 27 of bevel gear 7. Consequently, the combination of bevel gears 7 and 8, and pinion gears 11 and 12, permits limited slip of differential 1 in a conventional function.

Figure 2:
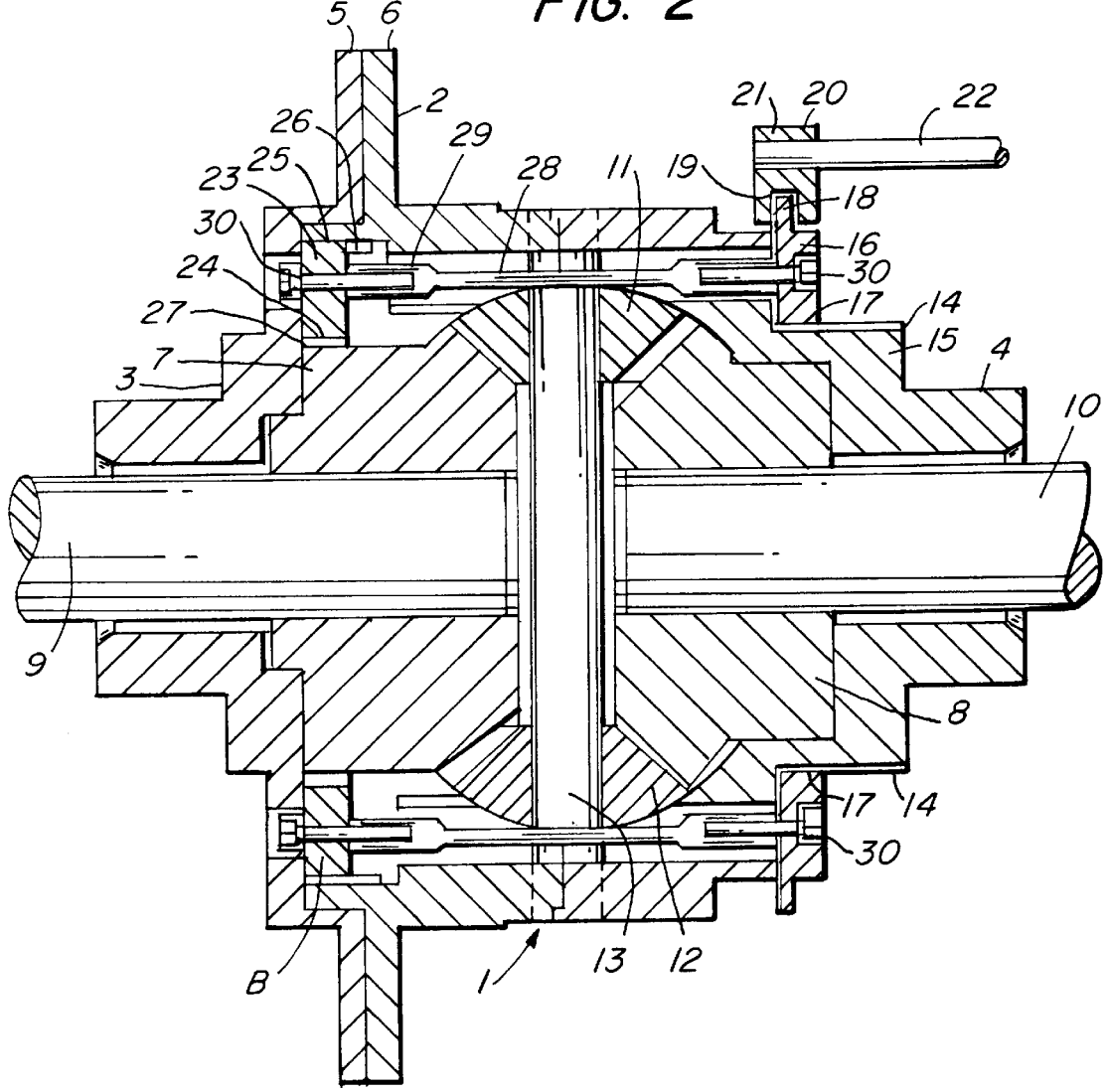
FIG. 2 is a cross-sectional view of the differential according to FIG. 1 in the locked position As shown in the drawings, a differential 1 is provided having a carrier 2. A ring gear (not shown) may be connected to the carrier 2 to engage a drive shaft (also not shown). Carrier 2 includes two parts, a first cover 3 and a second cover 4 which combine to define a cavity to house other parts of the differential 1. Each of the covers 3 and 4 has a peripheral flange 5 and 6 which are bolted together.

To lock the differential 1, its necessary to move the locking annulus 23 from position A shown in FIG. 1 to position B shown in FIG. 2. In the later position B, the external splines 25 of the locking annulus 23 continue to engage the internal splines of cover 4, whilst the inner splines of the locking annulus 23 engage the external splines of bevel gear 7. Consequently, bevel gear 7 is locked to cover 4 which in turned locks the differential 1 so that the same rotational movement is imparted to each of shafts 9 and 10.

Locking is effected by operating rod 22, which in turn moves actuator 21 from the right to left direction with respect to the drawings. This movement causes the selector annulus 16 to slide to the left along hub 15. As the selector annulus 16 is rigidly connected to the locking annulus 23 via push rods 28, it also moves to the right. This movement causes the inner splines 24 of the locking annulus 23 to engage in the external splines 27 of bevel gear 7.

To unlock the differential 1, the reverse operation is followed until the inner splines 24 of the locking annulus are moved to the right sufficiently to disengage the external splines 27 of bevel gear 7.

The locking differential of this invention avoids the need for additional locking components by having push rods directly connecting the selector annulus and the locking annulus. As such no special cage or piston is required.

Modifications and improvements will be readily apparent to those skilled in the art and are within the scope of the invention described.

I claim:

1. A lockable differential including:
   (a) a carrier;
   (b) a first bevel gear to engage a first shaft;
   (c) a second bevel gear disposed opposite the first bevel gear to engage a second shaft;
   (d) a first pinion gear and a second pinion gear, disposed opposite to each other, and supported by the carrier and each engaging the first and second bevel gears;
   (e) a lock assembly for locking the differential including
      (i) a selector annulus engaging the carrier;
      (ii) a locking annulus engaging the carrier and axially movable to selectively engage the first bevel gear; and
      (iii) a plurality of push rods connecting the selector annulus and the locking annulus;
   wherein the lock assembly is selectively movable between two operative states without assuming any other operative state, said two operative states including an unlocked state in which the locking annulus is not engaged with the first bevel gear and a locked state in which the locking annulus is engaged with the first bevel gear.

2. The lockable differential according to claim 1 wherein the selector annulus and the locking annulus are coaxially aligned.

3. The lockable differential according to claim 1 wherein the lock assembly further includes an actuator connected to the selector annulus to permit the movement of the selector annulus from a remote location.

4. The lockable differential according to claim 1 wherein the lock assembly further includes an actuator rod connected at one end to the selector annulus and extending to a remote location, to permit movement of the selector annulus from the remote location.

5. The lockable differential according to claim 1 wherein the selector annulus has internal splines and the carrier has external splines which inter-engage.

6. The lockable differential according to claim 1 wherein the locking annulus has internal splines and external splines, the carrier has internal splines and the first bevel gear has external splines, the external splines of the locking annulus engage the internal splines of the carrier, and the internal splines of the locking annulus selectively engage the external splines of the first bevel gear.

7. The lockable differential according to claim 1, wherein the plurality of push rods are disposed at regular arcuate intervals about the selector annulus and the locking annulus.

8. The lockable differential of claim 1 wherein the plurality of push rods are parallel to the axis of at least one of the selector annulus and the locking annulus.

9. The lockable differential according to claim 1 wherein each push rod has threaded portions at each of its ends and respectively engage in complementary threaded portions of the selector annulus and locking annulus.

* * * * *